(12) United States Patent
Duval et al.

(10) Patent No.: US 12,109,764 B2
(45) Date of Patent: Oct. 8, 2024

(54) AUTOMATED PLACEMENT OF COMPOSITE MATERIAL

(71) Applicant: Bell Helicopter Textron Inc., Fort Worth, TX (US)

(72) Inventors: Sébastien Duval, Terrebonne (CA); Pascal Flynn-Robitaille, Laval (CA)

(73) Assignee: Textron Innovations Inc., Providence, RI (US)

( * ) Notice: Subject to any disclaimer, the term of this patent is extended or adjusted under 35 U.S.C. 154(b) by 492 days.

(21) Appl. No.: 15/951,165

(22) Filed: Apr. 11, 2018

(65) Prior Publication Data
US 2019/0315076 A1    Oct. 17, 2019

(51) Int. Cl.
*B29C 70/38* (2006.01)
*B29C 70/20* (2006.01)
(Continued)

(52) U.S. Cl.
CPC .......... *B29C 70/382* (2013.01); *B29C 70/205* (2013.01); *B29C 70/88* (2013.01); *B32B 5/12* (2013.01); *B32B 5/26* (2013.01); *B32B 7/02* (2013.01); *B32B 7/03* (2019.01); *B64C 1/06* (2013.01); *G06F 30/15* (2020.01);
(Continued)

(58) Field of Classification Search
CPC ..... B29C 70/382; B29C 70/205; B29C 70/88; B29C 70/386; B29C 70/388
See application file for complete search history.

(56) References Cited

U.S. PATENT DOCUMENTS 4,696,707 A  *  9/1987  Lewis ................... B29C 70/386
                                                  156/64
9,770,873 B2    9/2017  Gilbert et al.
(Continued)

FOREIGN PATENT DOCUMENTS

CA          2948103 A1    11/2015
WO    WO-2016046788 A1  *  3/2016  ........... G01B 11/002
WO       2016199038 A1    12/2016

OTHER PUBLICATIONS

Pingulkar, P., B. Suresha, Free Vibration Analysis of Laminated Composite Plates Using Finite Element Method, Polymers & Polymer Composites, vol. 24, No. 7 (2016), pp. 529-538. (Year: 2016).*
(Continued)

*Primary Examiner* — Matthew J Daniels
(74) *Attorney, Agent, or Firm* — Lightfoot & Alford PLLC

(57) ABSTRACT

Methods and systems for automated placement of composite material on a surface of a component, the composite material including unidirectional fibers, is provided. A set of fiber paths along the surface is established, the set of fiber paths comprising at least one ply, each ply comprising a respective plurality of fiber paths being substantially aligned with a respective direction. An isotropy factor for the component is determined based on the set of fiber paths, the isotropy factor being indicative of a distribution of the plurality of fiber paths on the surface. When the isotropy factor exceeds a predetermined threshold, a respective layer of composite material is applied to the surface of the component using an automated fiber placement machine and for each of the at least one ply, wherein the unidirectional fibers of the composite material are applied along the set of fiber paths.

14 Claims, 10 Drawing Sheets

(51) Int. Cl.
- *B29C 70/88* (2006.01)
- *B32B 5/12* (2006.01)
- *B32B 5/26* (2006.01)
- *B32B 7/02* (2019.01)
- *B32B 7/03* (2019.01)
- *B64C 1/06* (2006.01)
- *G06F 30/15* (2020.01)
- *G06F 30/23* (2020.01)
- *B29L 31/30* (2006.01)
- *B64C 1/00* (2006.01)
- *G06F 113/26* (2020.01)

(52) U.S. Cl.
CPC ...... *G06F 30/23* (2020.01); *B29L 2031/3076* (2013.01); *B32B 2307/514* (2013.01); *B32B 2307/708* (2013.01); *B32B 2605/18* (2013.01); *B64C 2001/0072* (2013.01); *G06F 2113/26* (2020.01)

(56) References Cited

U.S. PATENT DOCUMENTS

| | | | |
|---|---|---|---|
| 2007/0173966 A1* | 7/2007 | Oldani | B29C 70/384 |
| | | | 700/110 |
| 2014/0288893 A1* | 9/2014 | Blom | G06F 30/23 |
| | | | 703/1 |
| 2016/0052214 A1 | 2/2016 | Gilbert et al. | |
| 2016/0179984 A1 | 6/2016 | Chen-Keat et al. | |
| 2017/0057195 A1 | 3/2017 | Blom et al. | |
| 2017/0228473 A1 | 8/2017 | Kang et al. | |
| 2017/0248406 A1 | 8/2017 | Shadmehri | |

OTHER PUBLICATIONS

Canadian Exam Report in related Canadian Patent Application No. 3,002,223 dated Mar. 6, 2020, 6 pages.

Canadian Exam Report in related Canadian Patent Application No. 3,002,223 dated Jul. 16, 2019, 6 pages.

* cited by examiner

AUTOMATED PLACEMENT OF COMPOSITE MATERIAL

TECHNICAL FIELD

The application relates generally to composite structure manufacturing and more specifically to automated placement of composite materials.

BACKGROUND OF THE ART

Automated fiber placement (AFP) machines are commonly used for applying composite materials, such as composite fibers, on various structures and components. Some AFP machines lay tape-like strips of fiber tows made of uncured fiber-reinforced composite material on a surface, such as component of the body of an aircraft. An AFP machine can be programmed to lay strips of tape along one or more predetermined paths and on a wide variety of surfaces.

Prior to application of fibers to a component by the AFP machine, paths along which the fibers are to be applied to the component must be established. The "fiber paths" must account both for the physical limitations of the AFP machine and material, and ensure that the fibers are disposed to maximize the stress resistance provided by the fibers to the component. Traditional approaches have assumed that the AFP machine will be able to apply fibers along any set of established fiber paths, resulting in imperfect application.

As such, there is room for improvement.

SUMMARY

In accordance with a broad aspect, there is provided a method for automated placement of composite material on a surface for manufacturing a component, the composite material including unidirectional fibers. The method comprises: establishing a set of fiber paths along the surface, the set of fiber paths comprising at least one ply, each ply comprising a respective plurality of fiber paths being substantially aligned with a respective direction; determining an isotropy factor for the component based on the set of fiber paths, the isotropy factor being indicative of a distribution of the plurality of fiber paths on the surface; and when the isotropy factor exceeds a predetermined threshold, applying, using an automated fiber placement machine and for each of the at least one ply, a respective layer of composite material to the surface of the component, wherein the unidirectional fibers of the composite material are applied along the set of fiber paths.

In some embodiments, the method further comprises, when the isotropy factor is below the predetermined threshold, identifying at least one region of the surface where at least some of the plurality of fiber paths have an angular distance less than a predetermined minimum angular distance; adjusting at least one of a position and an orientation of the at least some of the plurality of fiber paths to maintain an angular distance between adjacent fiber paths of the plurality of fiber paths that exceeds the predetermined minimum distance, thereby producing an adjusted set of fiber paths; and updating the isotropy factor for the component based on the adjusted set of fiber paths.

In some embodiments, the method further comprises, when the isotropy factor is below the predetermined threshold, identifying at least one region of the surface where at least some of the plurality of fiber paths of the set of fiber paths have an angular distance greater than a predetermined maximum angular distance; adjusting at least one of a position and an orientation of the at least some of the plurality of fiber paths to maintain an angular distance between adjacent fiber paths of the plurality of fiber paths that is less than the predetermined maximum distance, thereby producing an adjusted set of fiber paths; and updating the isotropy factor for the component based on the adjusted set of fiber paths.

In some embodiments, the method further comprises, repeating the steps of identifying and adjusting until the isotropy factor exceeds the predetermined threshold.

In some embodiments, the method further comprises: identifying, via a finite element analysis, at least one region of the surface where a stress factor exceeds a predetermined stress tolerance; adjusting at least one of a position and an orientation of at least some of the plurality of fiber paths to reduce stress for the at least one region, thereby producing an adjusted set of fiber paths; and updating the isotropy factor for the component based on the adjusted set of fiber paths.

In some embodiments, identifying the at least one region comprises highlighting the at least one region on a virtual rendering of the component.

In some embodiments, the method further comprises receiving input indicative of an adjustment to the set of fiber paths, wherein adjusting the position of the at least some fiber paths is based on the input.

In some embodiments, adjusting the position of the at least some of the plurality of fiber path comprises employing an artificial intelligence.

In some embodiments, the at least one ply comprises a first ply substantially aligned with a first direction and a second ply aligned with a second direction different from the first direction.

In some embodiments, the second direction is different from the first direction substantially by one of 90°, 60°, 45°, 30°, −30°, −45° and −60° from the first direction.

In some embodiments, the at least one ply comprises a first ply substantially aligned with a first direction, the first direction corresponding to a 0° orientation for the unidirectional fibers.

In some embodiments, the at least one ply comprises at least two subsequent plies, wherein the respective direction of each of the at least two plies is a common direction.

In some embodiments, the method further comprises validating the set of fiber paths by inspecting, for each of the at least one ply, the respective layer of composite material as applied to the surface.

In accordance with another broad aspect, there is provided a system for automated placement of fibers on a surface for manufacturing a component, comprising: a computer modelling system for: establishing a set of fiber paths along the surface, the set of fiber paths comprising at least one ply, each ply comprising a respective plurality of fiber paths being substantially aligned with a respective direction; determining an isotropy factor for the component based on the set of fiber paths, the isotropy factor being indicative of a distribution of the plurality of fiber paths on the surface; and when the isotropy factor exceeds a predetermined threshold, signaling for manufacture of, for each of the at least one ply, a respective layer of composite material along the set of fiber paths; and an automated fiber placement machine for applying the set of fibers to the surface of the component along the set of fiber paths in response to the signaling.

In some embodiments, when the isotropy factor is below the predetermined threshold, the computer modelling system is further configured for: identifying at least one region of the surface where at least some of the plurality of fiber paths have an angular distance less than a predetermined minimum angular distance; adjusting at least one of a position and an orientation of the at least some of the plurality of fiber paths to maintain an angular distance between adjacent fiber paths of the plurality of fiber paths that exceeds the predetermined minimum distance, thereby producing an adjusted set of fiber paths; and updating the isotropy factor for the component based on the adjusted set of fiber paths.

In some embodiments, when the isotropy factor is below the predetermined threshold, the computer modelling system is further configured for: identifying at least one region of the surface where at least some of the plurality of fiber paths of the set of fiber paths have an angular distance greater than a predetermined maximum angular distance; adjusting at least one of a position and an orientation of the at least some of the plurality of fiber paths to maintain an angular distance between adjacent fiber paths of the plurality of fiber paths that is less than the predetermined maximum distance, thereby producing an adjusted set of fiber paths; and updating the isotropy factor for the component based on the adjusted set of fiber paths.

In some embodiments, the computer modeling system is further configured for repeating the steps of identifying and adjusting until the isotropy factor exceeds the predetermined threshold.

In some embodiments, the computer modeling system is further configured for: identifying, via a finite element analysis, at least one region of the surface where a stress factor exceeds a predetermined stress tolerance; adjusting at least one of a position and an orientation of at least some of the plurality of fiber paths to reduce stress for the at least one region, thereby producing an adjusted set of fiber paths; and updating the isotropy factor for the component based on the adjusted set of fiber paths.

In some embodiments, identifying the at least one region comprises highlighting the at least one region on a virtual rendering of the component.

In some embodiments, the computer modeling system is further configured for receiving input indicative of an adjustment to the set of fiber paths, wherein adjusting the position of the at least some fiber paths is based on the input.

In some embodiments, adjusting the position of the at least some of the plurality of fiber path comprises employing an artificial intelligence In some embodiments, the at least one ply comprises a first ply substantially aligned with a first direction and a second ply aligned with a second direction different from the first direction.

In some embodiments, the second direction is different from the first direction substantially by one of 90°, 45°, and −45° from the first direction.

In some embodiments, the at least one ply comprises a first ply substantially aligned with a first direction, the first direction corresponding to a 0° orientation for the unidirectional fibers.

In some embodiments, the at least one ply comprises at least two subsequent plies, wherein the respective direction of each of the at least two plies is a common direction.

In some embodiments, the system further comprises a validation system for validating the set of fiber paths by inspecting, for each of the at least one ply, the respective layer of composite material as applied to the surface.

DESCRIPTION OF THE DRAWINGS

Reference is now made to the accompanying figures in which.

It will be noted that throughout the appending drawings, like features are identified by like reference numerals.

DETAILED DESCRIPTION

Illustrative embodiments of the methods and systems are described below. In the interest of clarity, all features of an actual implementation may not be described in this specification. It will, of course, be appreciated that in the development of any such actual embodiment, numerous implementation-specific decisions must be made to achieve a developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
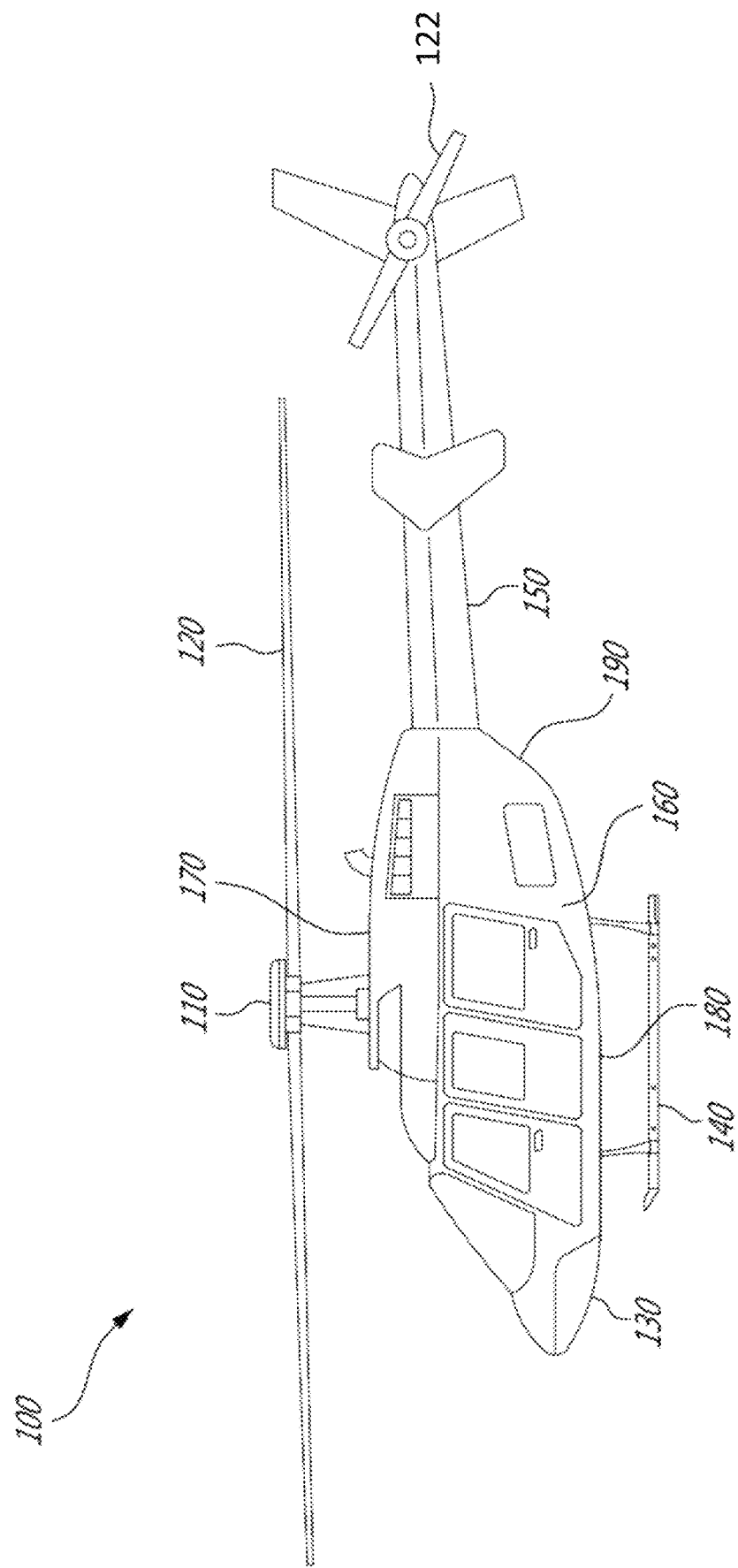
FIG. 1 is a schematic side view of a rotorcraft in accordance with a particular embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 rotates blades 120. Rotor system 110 includes a control system for selectively controlling the pitch of each blade 120 in order to selectively control direction, thrust, and lift of rotorcraft 100. Fuselage 130 represents the body of rotorcraft 100 and is coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 122. Blades 122 provide thrust in the same direction as the rotation of blades 120 so as to counter the torque effect created by rotor system 110 and blades 120. It should also be appreciated that teachings regarding rotorcraft 100 may apply to aircraft and vehicles other than rotorcraft, such as airplanes and unmanned aircraft, to name a few examples.

The present disclosure focuses primarily on methods and systems for automated placement of composite materials, including fibrous materials, on or as part of a component of the rotorcraft 100, for instance as a part or a whole of the fuselage 130. However, it should be understood that the methods and systems described herein may be applicable to form any other suitable type of composite component in any other suitable context or field of application.

Figure 2:
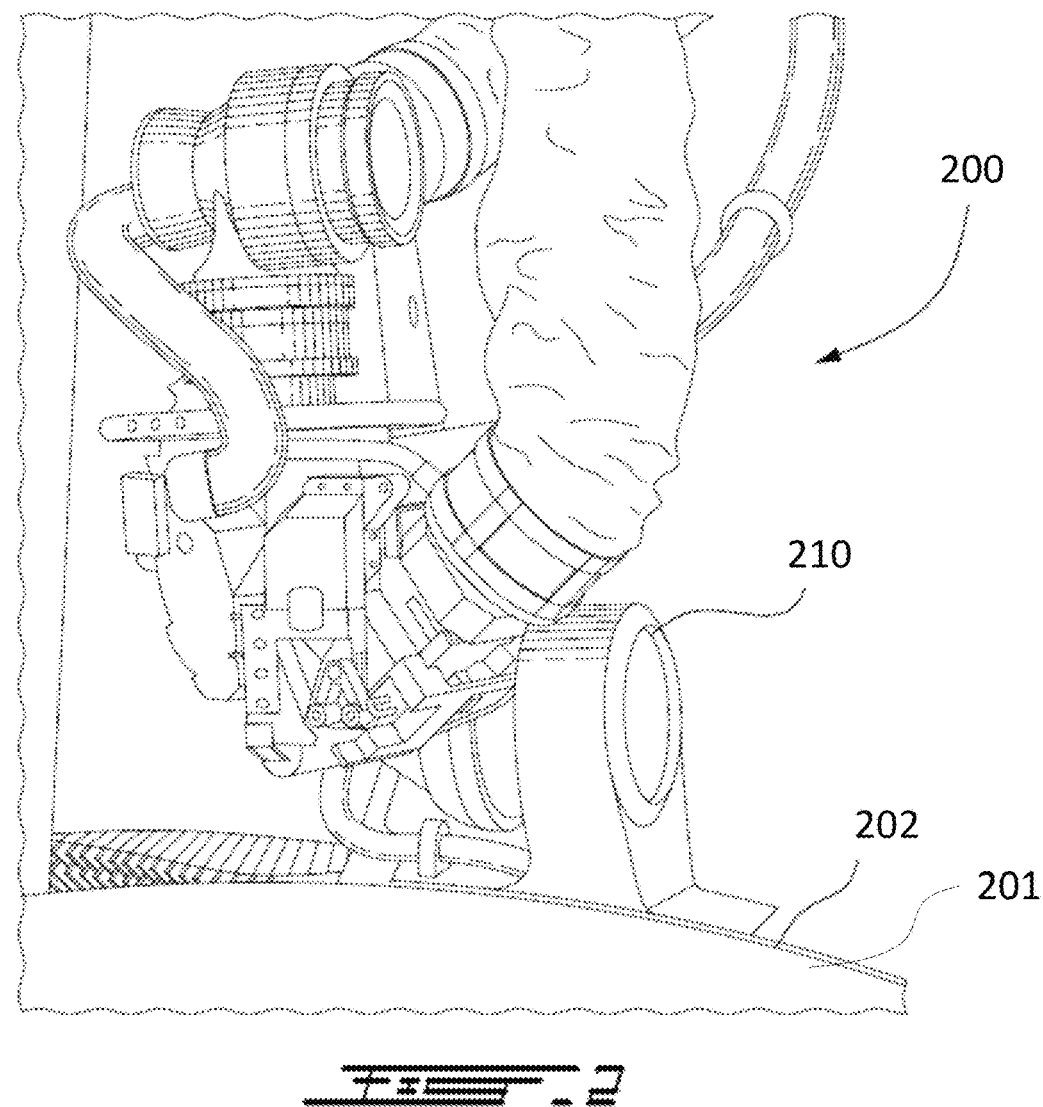
FIG. 2 is a schematic tridimensional view of an automated fiber placement (AFP) machine which may be used for example to manufacture components of the rotorcraft of FIG. 1.
Figure 3:
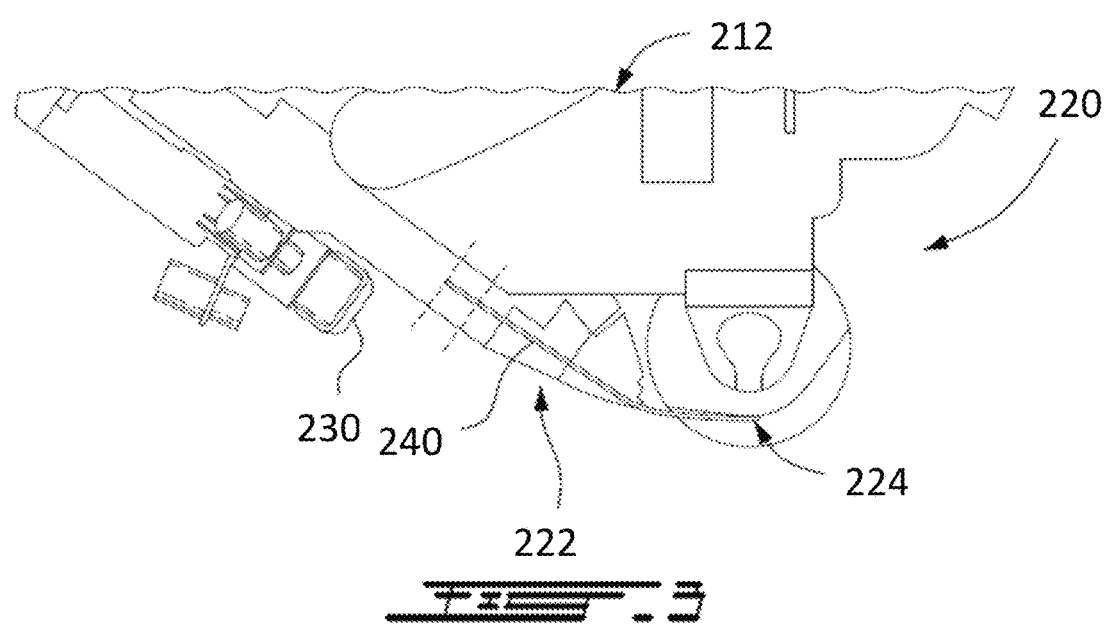
FIG. 3 is a schematic side elevation view of a laying head of the AFP machine of FIG. 2.

Referring to FIGS. 2-3, an automated fiber placement machine, referred to herein below as an AFP machine, is shown at 200. The AFP machine 200 has a robotized arm 210 and a laying head 220 secured to a distal end 212 of the robotized arm 210. The AFP machine 200 is configured to heat and compact resin pre-impregnated fibers typically provided in the form of fiber tows, where each fiber tow is formed by a bundle of fibers (e.g. carbon fibers) impregnated with resin (e.g. epoxy resin). The tows are fed inside the laying head 220 through a material dispenser 222, and may be heated using heating device 230 before being applied by roller 224 as a single tape or strip composed of adjacent fiber tows on a surface 202 of a component 201, so that the fiber tows are laid on the surface 202 adjacent one another. The AFP machine 200 is able to lay tapes 240 at a plurality of laying speeds, along a wide range of length values, and along paths having a wide range of variable or constant steering radii. In the present specification, including claims, the term "tape" is intended to include one or more fiber tows disposed adjacent to one another and configured for deposition by an AFP machine, with the number of fiber tow(s) defining the tape being determined by the specification of the AFP machine 200. In the embodiment shown, the AFP machine is a Coriolis™ AFP machine having an 8 tow, ¼ inch head. It is however understood that the present disclosure is applicable to any other suitable type AFP machine. The tapes 240 are laid by the AFP machine in uncured form, for example first against a suitable support surface (e.g. mandrel, mold, film received on a mold surface) and then in multiple layers or plies over previously laid tapes 240, and once all of the composite material is in place, the assembly is cured using a suitable method so as to obtain the desired component. It should be noted that other embodiments are also considered, for instance where a curing processes is performed for each layer or for each individual tape 240, independently.

In order for the AFP machine 200 to function, it must be provided with instructions detailing the procedure for applying the tape 240 to the surface 202. This includes establishing paths along which the fibers which compose the tape 240 are to be located. Alternatively, paths for the tape 240 itself can also be established; although the foregoing discussion will focus primarily on fiber paths, it should be understood that similar techniques can be applied to tape paths, and that other similar approaches are also considered.

Figure 4:
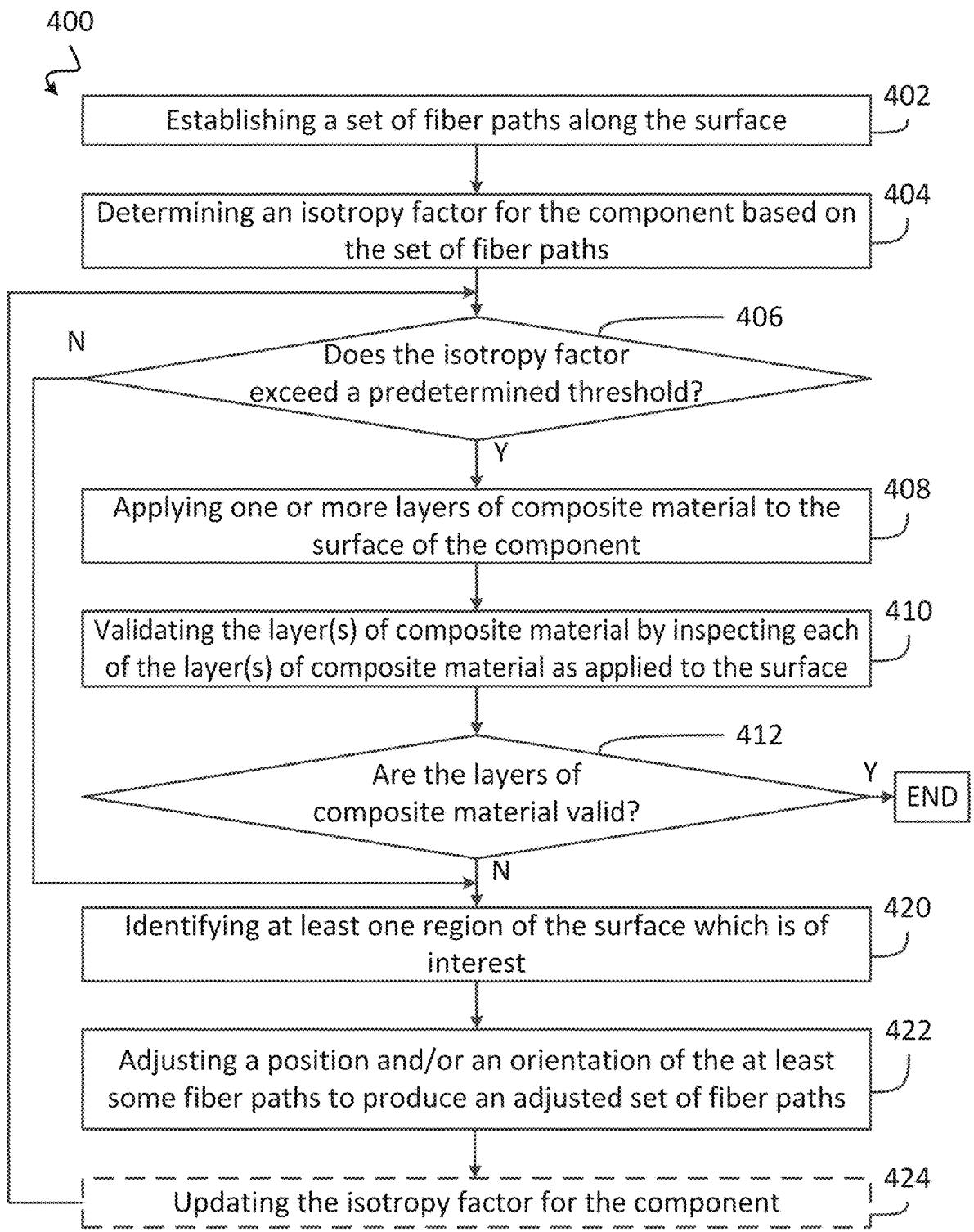
FIG. 4 is a flowchart illustrating an example method for automated placement of composite materials, in accordance with an embodiment.

With reference to FIG. 4, a method 400 for automated placement of composite material is illustrated. The composite material can be placed on a suitable mold surface (e.g. directly on the mold surface, on a suitable film overlaying the mold surface, on previously disposed layer(s) of composite material overlaying the mold surface) so as to obtain a component once the composite material is cured, for instance the mold surface 202 configured to create the component 201 of the fuselage 130 of the rotorcraft 100, and the composite material to be placed can include one or more unidirectional fibers, one or more tapes or strips composed of one or more unidirectional fibers, for instance the tape 240, or any other suitable composite material.

At step 402, a set of fiber paths is established along the surface 202. The set of fiber paths is composed of at least one ply, and each ply is composed of a plurality of fiber paths. Each fiber path represents the location and orientation along which a composite fiber should be applied to the surface 202, for example via the AFP machine 200, and each ply represents one layer of composite material, itself made up of a plurality of fiber paths. Put differently, each ply is an equivalent representation of a layer of fibers to be manufactured and cured on the component 201.

In some embodiments, the fiber paths which compose the set of fiber paths span substantially the entire surface 202, and each ply in the set of fiber paths can span part or all of the surface 202. In other embodiments, the fiber paths span one or more portions of the surface 202. In addition, some fiber paths and/or plies can span substantially across the entire surface 202, whereas other fiber paths and/or plies span across a portion of the surface 202. The fiber paths of each ply are also substantially aligned with a respective particular direction: in some cases, the fiber paths are aligned with a horizontal axis, vertical axis, and the like; in some other cases, the fiber paths are aligned with a contour of the surface 202; in still other cases, the fiber paths are aligned with a direction that is a hybrid between a horizontal axis and a contour of the surface 202. Still other directions to which the fiber paths of each ply are aligned can be considered. As discussed in greater detail hereinbelow, subsequent fiber path plies can also be established, and together the first and subsequent fiber path plies form a fiber path network.

Figure 5A:
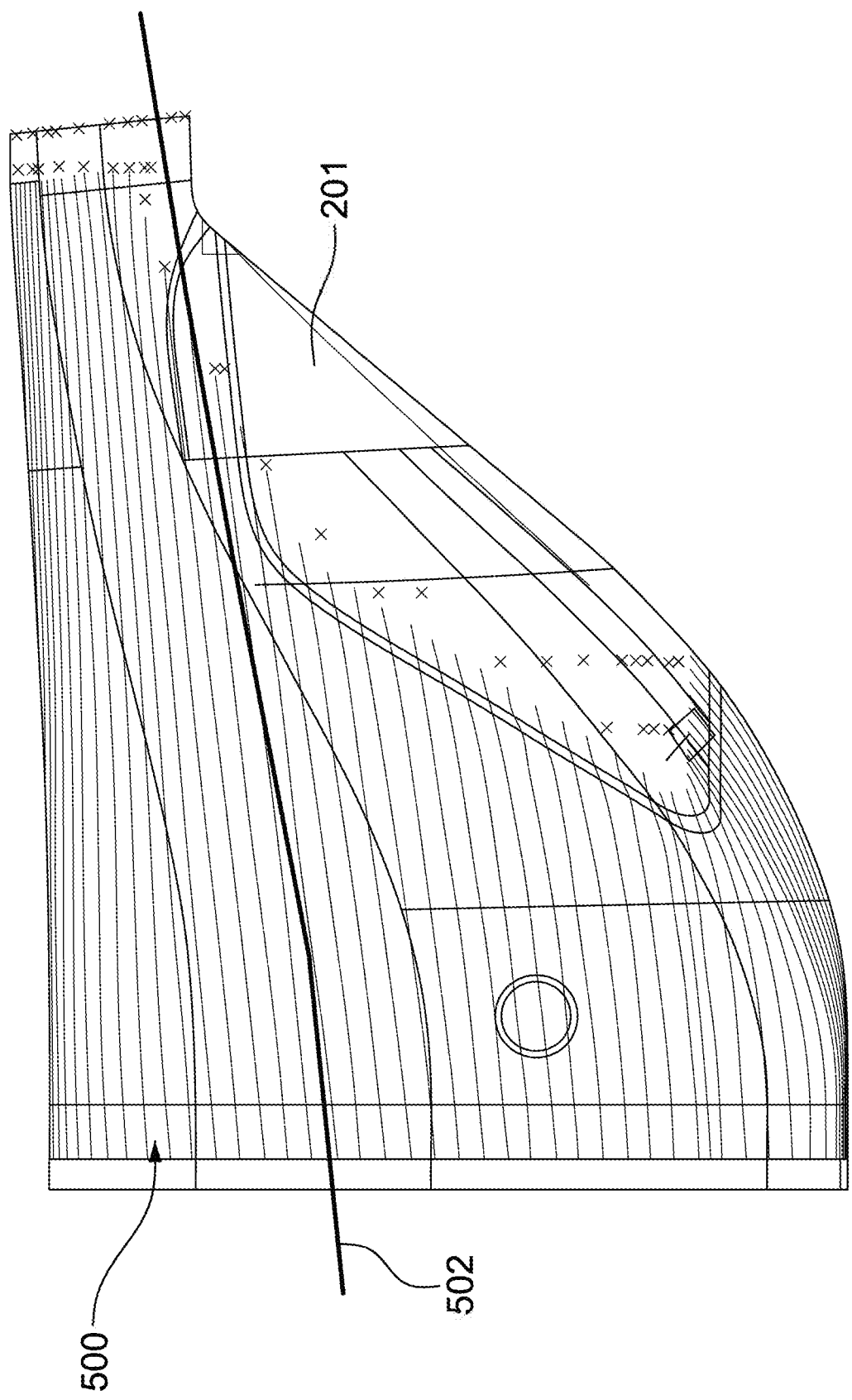
FIG. 5A is a schematic tridimensional view of a component with an example ply of fiber paths.

With additional reference to FIG. 5A, a graphical representation of the component 201 associated with the surface 202 is shown. A first ply of the set of fiber paths is shown as lines 500, which span substantially the entire component 201. In addition, the fiber paths of the first ply 500 are substantially aligned with a direction, as illustrated by line 502. In the embodiment shown, the direction 502 is substantially horizontal with some curvature to partially follow the contour of the component 201; the direction 502 substantially corresponds to the longitudinal axis of the rotorcraft such that the fiber paths of the first ply 500 define a "0°" layer for the component 201, which is to say that the fibers of the 0° layer are at substantially 0° from the direction 502. Other types of directions which the fiber paths of the first ply 500 are aligned with can also be considered.

In some embodiments, the first ply 500 can be established using a computer modeling system, which can include computer-assisted drawing (CAD) tools, artificial intelligence (AI) tools, and the like. In some embodiments, an AI tool can assist or augment a first iteration of the first ply 500 input via a CAD or other similar tool. As discussed in greater detail hereinbelow, in some embodiments the first ply 500 is one of a plurality of plies, each composed of a plurality of fiber paths and each ply is associated with a respective layer of composite material applied over the surface 202; with the layers disposed one over the other until a desired thickness for the component 201 is obtained.

Figure 5B:
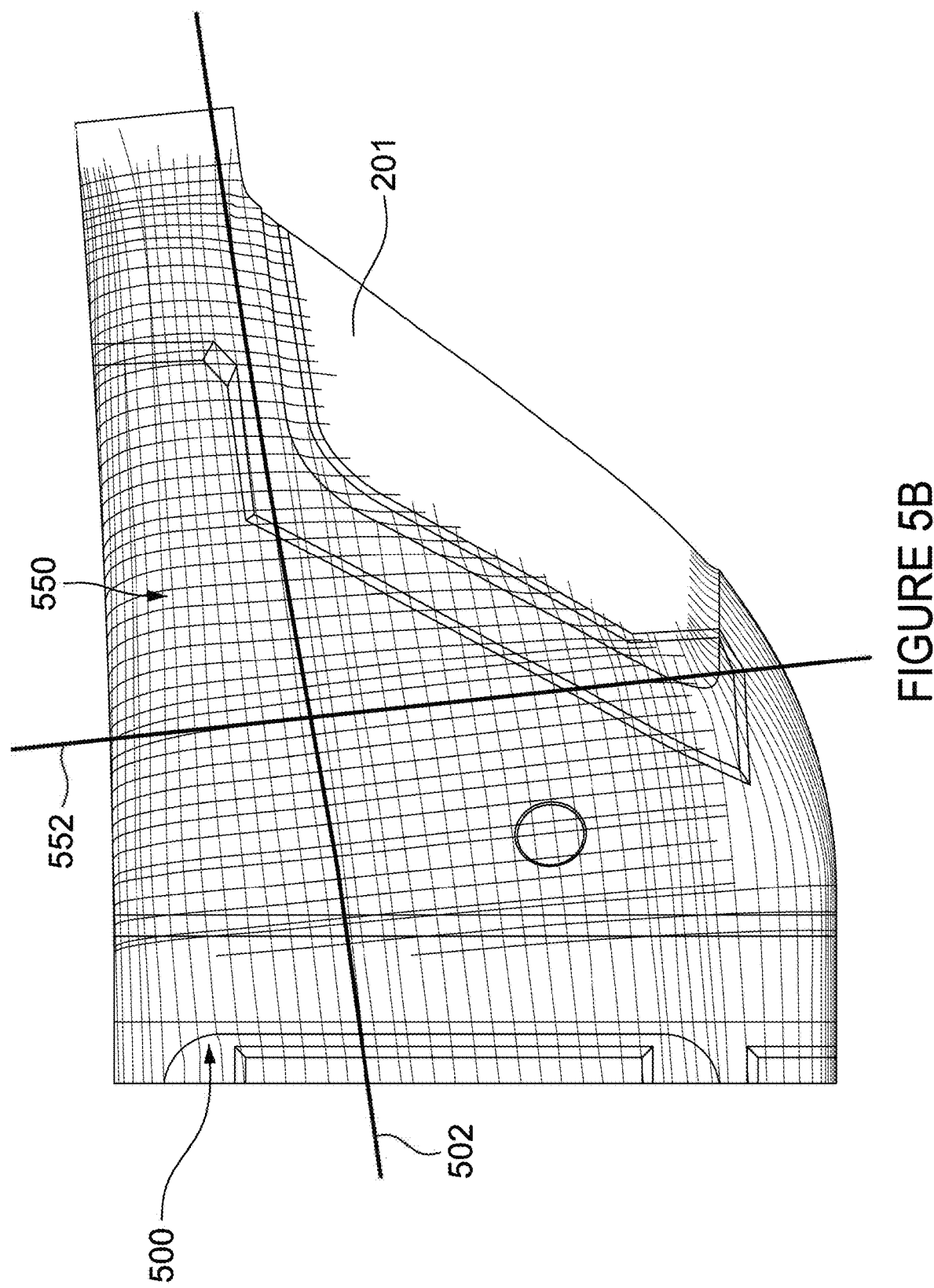
FIG. 5B is a schematic tridimensional view of the component of FIG. 5A with an additional example ply of fiber paths.

With additional reference to FIG. 5B, a second ply 550, applied over the first ply 500, is illustrated, which corresponds to a different layer of composite material to be applied for example over the layer of material corresponding to the first ply 500. The second ply 550 is aligned with a subsequent direction 552. In some embodiments, including the embodiment illustrated in FIG. 5B, the subsequent direction 552 differs from the direction 502 for the set of fiber paths at least insofar as the subsequent direction 552 is not parallel with the direction 502. In some embodiments, the subsequent direction 552 is substantially orthogonal to the direction 502; that is to say, there is a difference of approximately 90° between the direction 502 and the direction 552. In other embodiments, the difference between the subsequent direction 552 and the direction 502 can be 30°, 45°, 60°, −30°, −45°, −60°, and the like. In embodiments where multiple subsequent sets of fiber paths are established, each of the subsequent directions may differ from both the direction 502 and all the other subsequent directions; alternatively, two or more sets of fiber paths corresponding to different layers may have a common direction, including two or more subsequent plies, where appropriate. The second ply 550 can be established in similar fashion to the way in which the first ply 500 is established, and any additional ply can be established using similar techniques. This can include establishing the second ply 550 via a CAD tool, via an AI tool, and the like.

In some embodiments, a single ply can comprise fiber paths that are oriented according to more than one direction. For example, the composite material to be applied is a single-layer braided composite material, that is to say a single layer of composite material which is composed of fibers which are braided in accordance with a particular pattern. A representation of the single-layer braided composite material by a ply of fiber paths can be done using a single ply, but with multiple orientations, each associated with a portion of the fibers to represent the orientation of that portion of the fibers in the braided composite material.

Referring back to FIG. 4, at step 404, an isotropy factor for the component 201 is determined based on the set of fiber paths, which can include plies 500, 550, and any other number of plies. The isotropy factor is a measure of the distribution of the plies, and of the fiber paths about the surface 202, and can be based on a number of factors, including the properties of the fibers (e.g. Young's modulus), an orientation of fiber paths 500, a number of plies, a principal orientation of stress or load which will be exerted on the component 201, and other factors, as appropriate. For example, a set of fiber paths composed of two plies with fiber paths aligned with substantially orthogonal directions has a higher isotropy factor than another set of fiber paths where the two plies are aligned with directions that are not orthogonal. In another example, a set of fiber paths composed of one ply with fiber paths that covers substantially the whole surface 202 has a higher isotropy factor than another set of fiber paths composed of two plies which do not substantially cover the whole surface 202.

In some embodiments, the isotropy factor is indicative of whether an angular distance between at least some of the plies 500, 550 is too small, or too large, for example as measured against a minimum or maximum angular distance between fiber paths. In other embodiments, the isotropy factor is indicative of the mechanical strength provided by the fiber paths 500 at various locations on the component 201.

Figure 6:
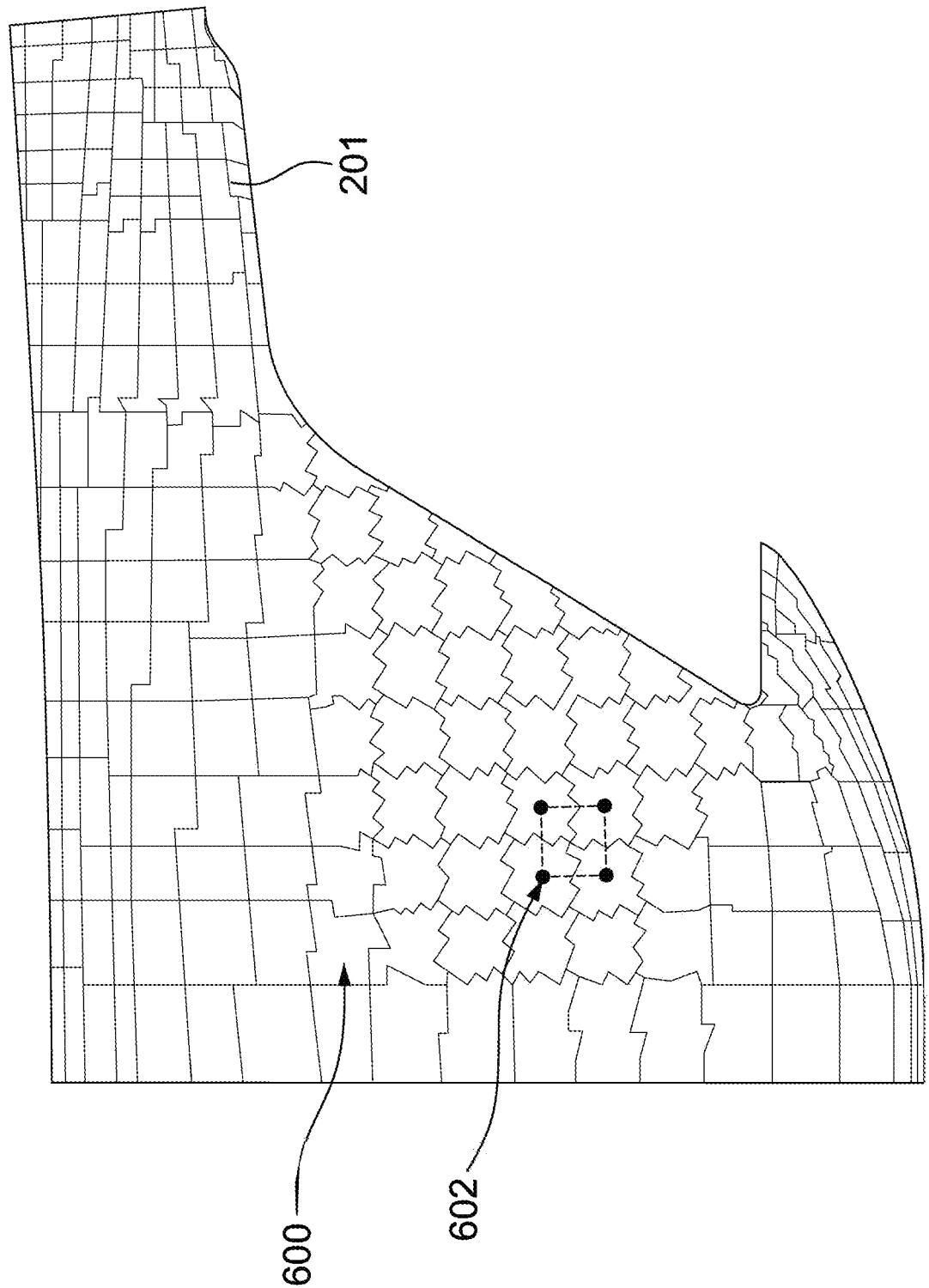
FIG. 6 is a schematic tridimensional view of an example finite element model used for analysis of the component of FIG. 5.

With additional reference to FIG. 6, in order to determine the isotropy factor, a finite element analysis can be performed. The finite element analysis involves subdividing the component 201 associated with the surface 202 into a plurality of smaller elements 600. Then, evaluations of the angular distance between the plies 500, 550 of the set of fiber paths and of the stress exerted for each of the elements 600 is performed.

In some embodiments, the division of the component 201 into the elements 602 is performed by allocating substantially the same size to each of the elements 602. In other embodiments, the elements 602 are sized differently to account for one or more factors, which can include a radius of curvature of the surface 202 or of a portion thereof, a level of convergence of the fiber paths of the plies 500, 550 at different locations on the surface 202, and a relative importance of a portion of the component 201, for instance whether the portion of the component 201, when assembled, is proximate an element of the rotorcraft 100 generating loads, such as an engine, a transmission, and the like.

The finite element analysis can thus be used to evaluate, based on the results obtained for each of the elements 602, a local isotropy factor based on the orientation between the fiber paths of various plies 500, 550, the experienced stress and loads, and any other suitable factors, and the isotropy factor for the a layer of the component 201 and/or the component 201 as a whole can be determined based any suitable combination of the local isotropy factors.

Figure 7:
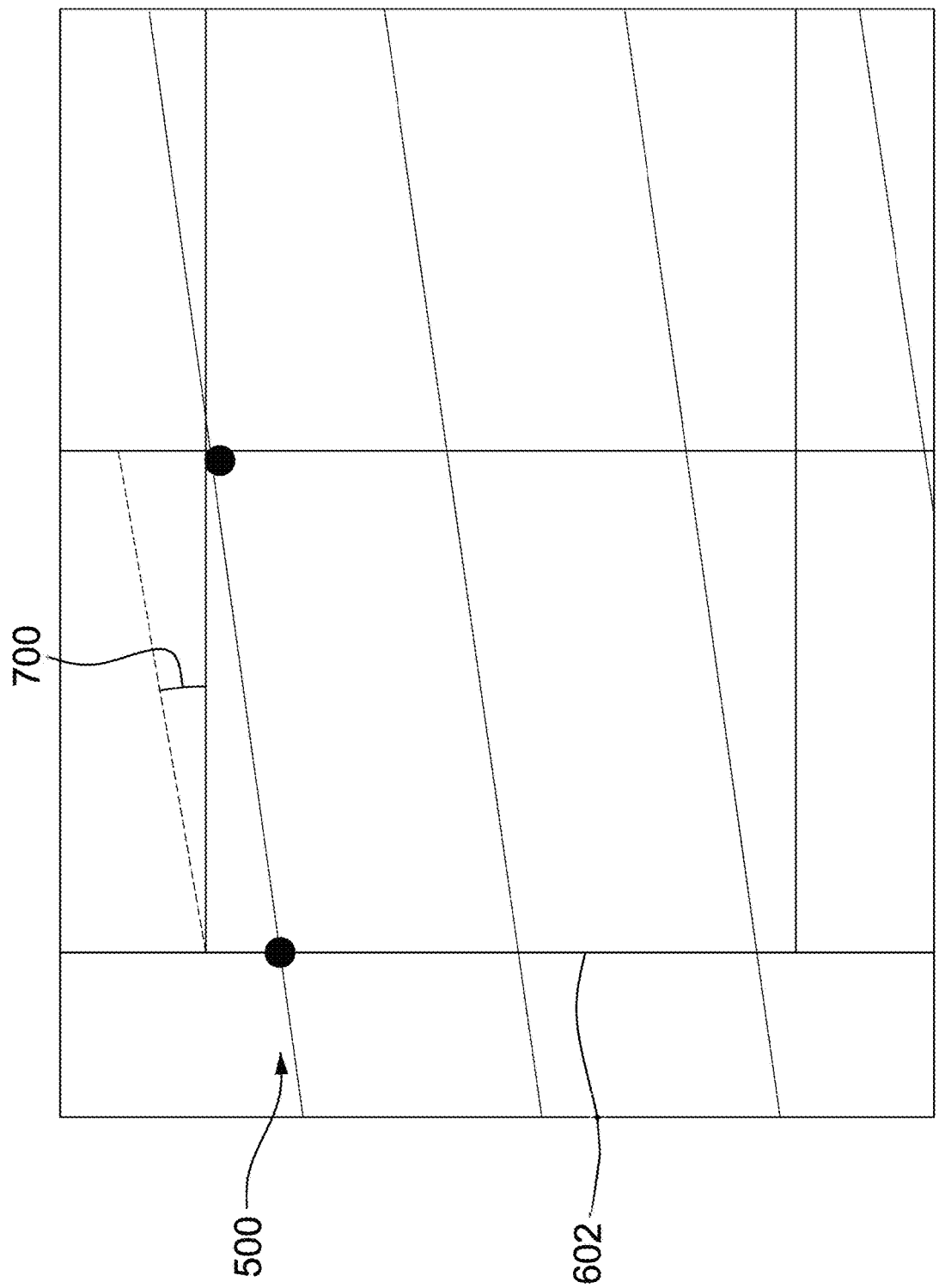
FIG. 7 is an enhanced view of a portion of the finite element model of the component and the example ply of fiber paths of FIG. 5A.

With continued reference to FIG. 6 and additional reference to FIG. 7, an example of one type of analysis is presented. FIG. 7 shows an enhanced, or zoomed, view of one element 602, in which the fiber paths 500 present in the element 602 are also illustrated. As part of the analysis, an angle 700 between the fiber paths in ply 500 and a reference direction corresponding to a local projection of the direction 502 (and which, in the embodiment shown, corresponds to the horizontal boundary of the element 602), is determined for each intersection between the fiber path and the boundaries of the element 602. It should be noted that in other embodiments, the reference direction can be any suitable direction unrelated to the direction 502, for instance an arbitrary reference direction. For example, the law of cosines can be used to determine the angle of the fiber paths of the ply 500 with respect to the direction 502.

It should be noted that any suitable number of subsequent plies of fiber paths can be also established. The subsequent plies of fiber paths represent the location and orientation in which additional composite fibers should be applied to the surface 202, for example via the AFP machine 200. These additional composite fibers can form one or more supplementary layers which are applied on top of the first layer. The surface 202 can have any suitable number of layers of composite fibers applied thereto, which are cured after all layers are applied so as to obtain the component 201.

At decision step 406, an evaluation is made regarding whether the isotropy factor exceeds a predetermined threshold. The predetermined threshold can be indicative of a minimum level of isotropy acceptable by the user of the component, for example as part of the fuselage 130 of the rotorcraft 100. For instance, different portions of the fuselage have different isotropy requirements: portions which cover mission-critical parts of the rotorcraft, such as the engine, can require a higher level of isotropy than portions which cover other parts of the rotorcraft. If the isotropy factor does exceed a predetermined threshold, the method 400 moves to step 408. If the isotropy factor does not exceed a predetermined threshold, the method 400 moves to step 420. It should be noted that although the isotropy factor here is compared against a "minimum" threshold, other embodiments may, for example, consider an anisotropy factor which is compared against a "maximum" threshold, and that still other variations are considered.

At step 408, once the isotropy factor is determined to exceed the predetermined threshold, one or more layers of composite material are applied to the surface 202. The layers of composite material include unidirectional fibers, and are applied such that the unidirectional fibers of the composite material are applied along the plies 500, 550, of the set of fiber paths. The layers of composite material can be applied, for example, via the AFP machine 200, or using any other suitable technique.

At step 410, after application of each of the layers of composite material to the surface 202, the layers of composite material are validated via inspection. More specifically, an inspection of the layers of composite material as they are applied to the surface 202 is performed. In some embodiments, the inspection is a visual inspection performed, for example, using a computer vision or other computer-assisted process. In other embodiments, the inspection uses ultrasonic techniques, laser-based techniques, and the like.

Steps 408 and 410 can be performed iteratively, such that a first layer of composite material is applied along the fiber paths of the first ply 500, in accordance with step 408, and validated, in accordance with step 414, before any subsequent layers of composite material are applied along subsequent sets of fiber paths, for example the fiber paths of the second ply 550. More specifically, in cases where one or more subsequent sets of fiber paths, for example the fiber paths of the second ply 550, are also established, steps 408 and 410 can be performed repeatedly for each of the plies. Each subsequent ply is associated with a separate subsequent layer of composite material, which is placed overtop the preceding layer by repeating step 408, which can be the first layer of composite material, or a preceding one of the subsequent layers of composite material. Thereafter, validation of the each subsequent layer, in step 410, can be performed.

Figure 8:
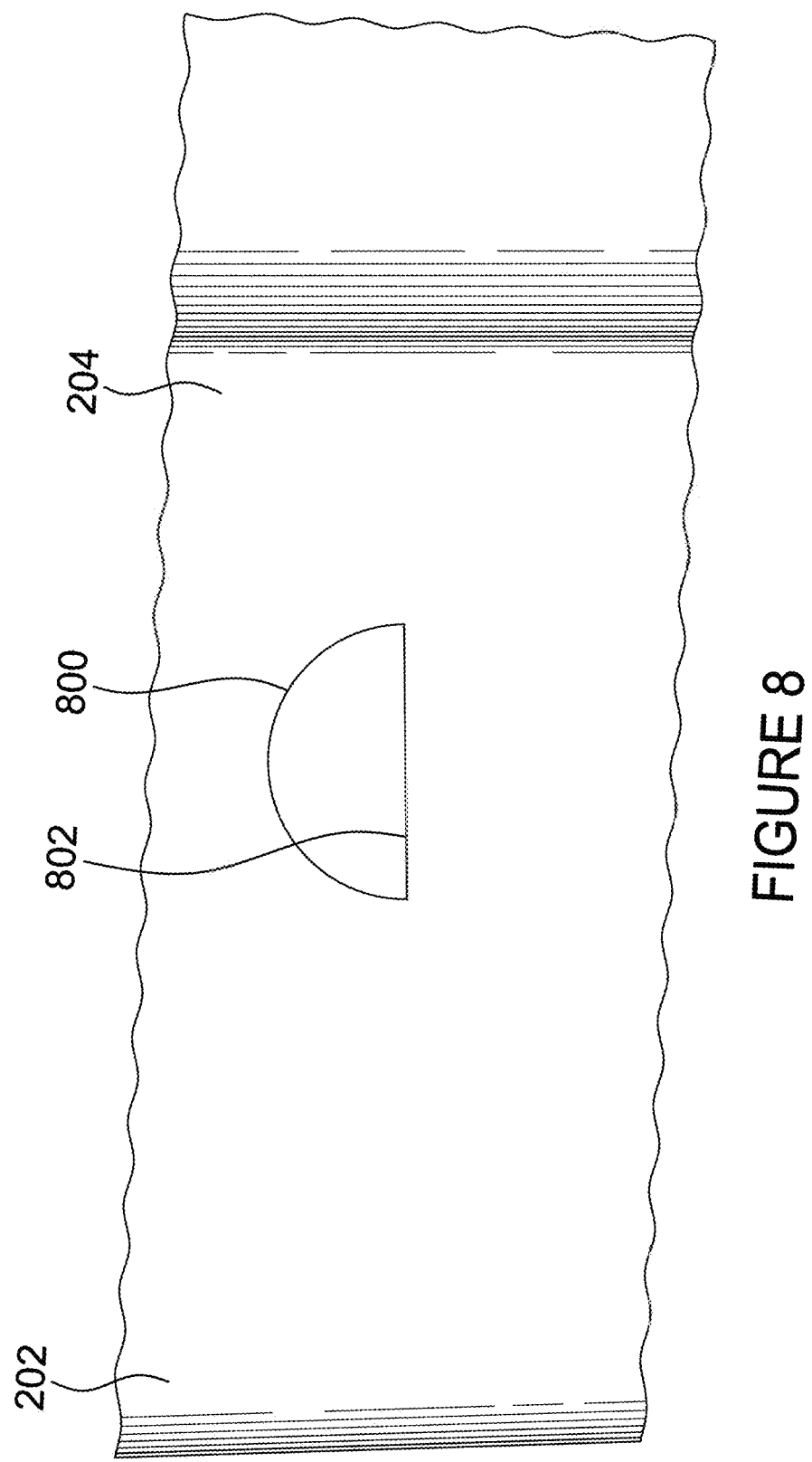
FIG. 8 is a top-down view of an example validation system for fiber paths applied on the component of FIG. 5A.

With additional reference to FIG. 8, in some embodiments a laser device is used to project a reference shape 800 on the layer 204 of composite material applied over the surface 202. The reference shape 800, and more specifically a line portion 802 thereof, can be used as a comparison for the orientation of the layer 204 of composite material. For example, and angle between the line portion 802 of the reference shape 800 and the orientation of the fibers which compose the layer 204 can be determined, for instance using a computer vision system. If the angle between the line portion 802 and the orientation of the fibers is less than a predetermined value, then the first layer of composite material can be considered valid. Conversely, if the angle between the line portion 802 and the orientation of the fibers exceeds the predetermined value, then the first layer of composite material can be considered invalid. An invalid layer of composite material can cause the component to which the layer is applied to be discarded, or the layer can be removed and reapplied or appropriate measures are taken to ensure structural integrity of the component.

At decision step 412, an evaluation is made regarding the validity of the layer(s) of composite material as applied to the surface 202. In some embodiments, an evaluation is made regarding the suitability of the sets of fiber paths for application to the surface 202. For instance, an evaluation can be made regarding the capability of the AFP machine 200 to apply the composite material as directed by the first ply 500, the second ply 550, and/or any subsequent plies. If the AFP machine 200, or any other part of the application process (as carried out in step 408) is found to be inadequate for applying the layers of composite material in accordance with the various plies, the method 400 can proceed to step 420, discussed in greater detail hereinbelow, to proceed with adjustments to the set of fiber paths. If the validation at step 412 indicates that the set of fiber paths is suitable, then the method 400 can terminate.

With continued reference to FIG. 4, if, at decision step 406, the isotropy factor is found not to exceed the predetermined threshold, or if, at decision step 412, the layers of composite material are found not to be valid, the method 400 proceeds to step 420.

At step 420, at least one region of the surface 202 which is identified as being of interest. In some embodiments, the at least one region of the surface 202 is identified as being of interest because at least some of the fiber paths of one or more plies of fiber paths, including the first ply 500 and the second ply 550, are closer than a predetermined minimum angular distance or are farther apart than a predetermined maximum angular distance. In some other embodiments, the at least one region of the surface 202 is identified as being of interest because a stress factor for at least some of the fiber paths in the region of the surface 202 exceeds a predetermined isotropy. In some embodiments, the identification of the regions of interest is based on the elements 602 used in the finite element analysis of step 404.

At step 422, a position and/or an orientation of the at least some fiber paths is adjusted to produce an adjusted set of fiber paths. In some embodiments, the position and/or orientation of the at least some fiber paths in one or more plies are adjusted to maintain a predetermined minimum angular distance between fibers, or maintain an angular distance between fibers that is less than a predetermined maximum distance. Alternatively, or in addition, the position and/or orientation of the at least some fiber paths can be adjusted to improve the isotropy for one or more regions of the surface 202. Step 422 can additionally, or in the alternative, include adding one or more plies and/or one or more fiber paths to existing plies, and include removing one or more plies and/or one or more fiber paths from existing plies, as appropriate.

In some embodiments, the position and/or orientation of fiber paths of the plies 550, 550, or any other ply, can be adjusted via the CAD tool and/or the AI tools discussed hereinabove. For example, the CAD tool can highlight one or more regions of the surface 202 which are identified as being of interest on a virtual rendering of the surface 202 to draw attention to a user of the CAD tool. Additionally, the adjustment of the position and/or orientation of the fiber paths can be performed in response to input received from the user of the CAD tool, for instance via one or more input devices, which can include touchscreens, mice, keyboards, and the like. Alternatively, or in addition, the adjustment of the position and/or orientation of the fiber paths can be performed via a machine learning or AI tool. For example, the AI tool can iteratively modify the fiber paths to determine an adjusted set of fiber paths having an isotropy factor which exceeds the predetermined threshold. In another example, the AI tool iteratively modifies the fiber paths to determine a plurality of potential adjusted sets of fiber paths, and a user of the AI tool can then select one of the potential adjusted sets of fiber paths.

It should also be noted that in some cases, the set of fiber paths and/or the adjusted set of fiber paths may be established and/or selected because it exhibits a particular stress profile. For instance, a particular set of fiber paths may offer a more robust stress profile for a first region of the surface 202, and a less robust stress profile for another region. If the first region is, for example, located proximate to mission critical hardware for the rotorcraft, the particular set of fiber paths can be selected over other potential sets of fiber paths.

In some embodiments, steps 406, 420, 422, and 424 can be repeated any suitable number of times to ensure that the isotropy factor for the component does exceed the predetermined threshold. In addition, all of the various steps disclosed herein as applicable to the set of fiber paths as a whole, or to one or multiple plies, which compose the set of fiber paths, substantially simultaneously.

Implementation of the method 400 can be used to ensure that the instructions provided to the AFP machine 200 lead to application of composite material, including unidirectional fibers, to the surface 202 in a way that ensures a proper angular distance of the unidirectional fibers and adequate stress mitigation for the component. Additionally, by applying the layer(s) of composite material and inspecting the application of the composite material to the surface 202, the application process can be validated. Moreover, the iterative process for establishing and adjusting the set(s) of fiber paths can assist in reducing the likelihood of manufacturing components which do not meet specifications.

Figure 9:
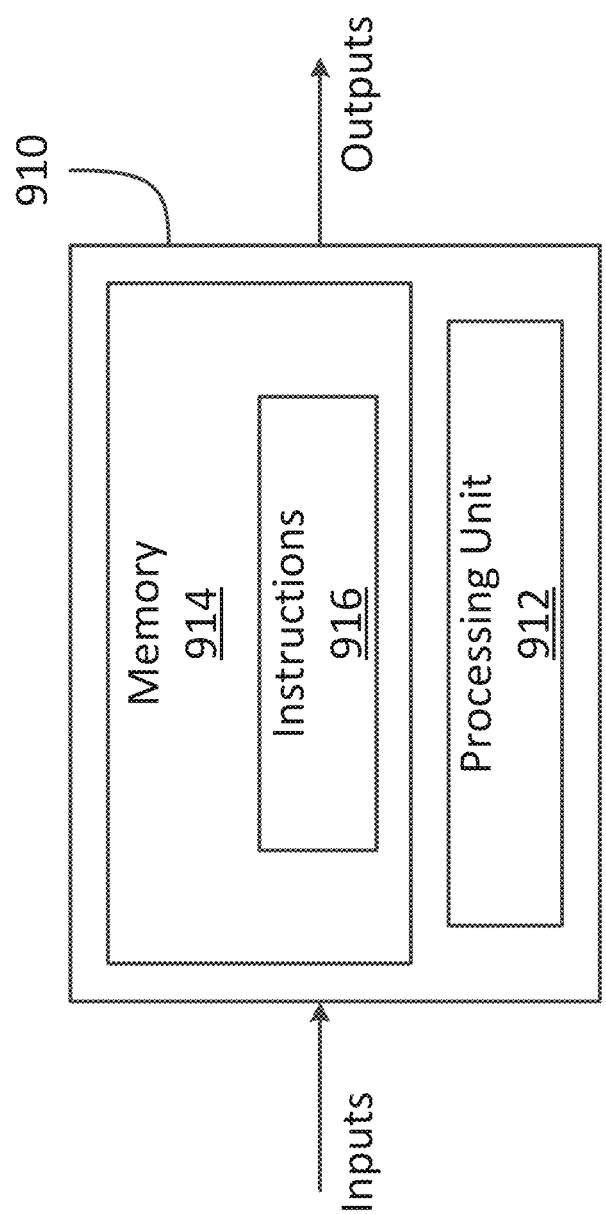
FIG. 9 is a schematic diagram of an example computing system for implementing the method of FIG. 4.

With reference to FIG. 9, the method 400 may be implemented by a computing device 910, comprising a processing unit 912 and a memory 914 which has stored therein computer-executable instructions 916.

The processing unit 912 may comprise any suitable devices configured to implement the method 400 such that instructions 916, when executed by the computing device 910 or other programmable apparatus, may cause the functionality described as part of the method 400 described herein to be implemented. The processing unit 912 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 914 may comprise any suitable known or other machine-readable storage medium. The memory 914 may comprise non-transitory computer readable storage medium, for example, but not limited to, an electronic, magnetic, optical, electromagnetic, infrared, or semiconductor system, apparatus, or device, or any suitable combination of the foregoing. The memory 914 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 914 may comprise any storage means (e.g., devices) suitable for retrievably storing machine-readable instructions 1016 executable by processing unit 912.

Figure 10:
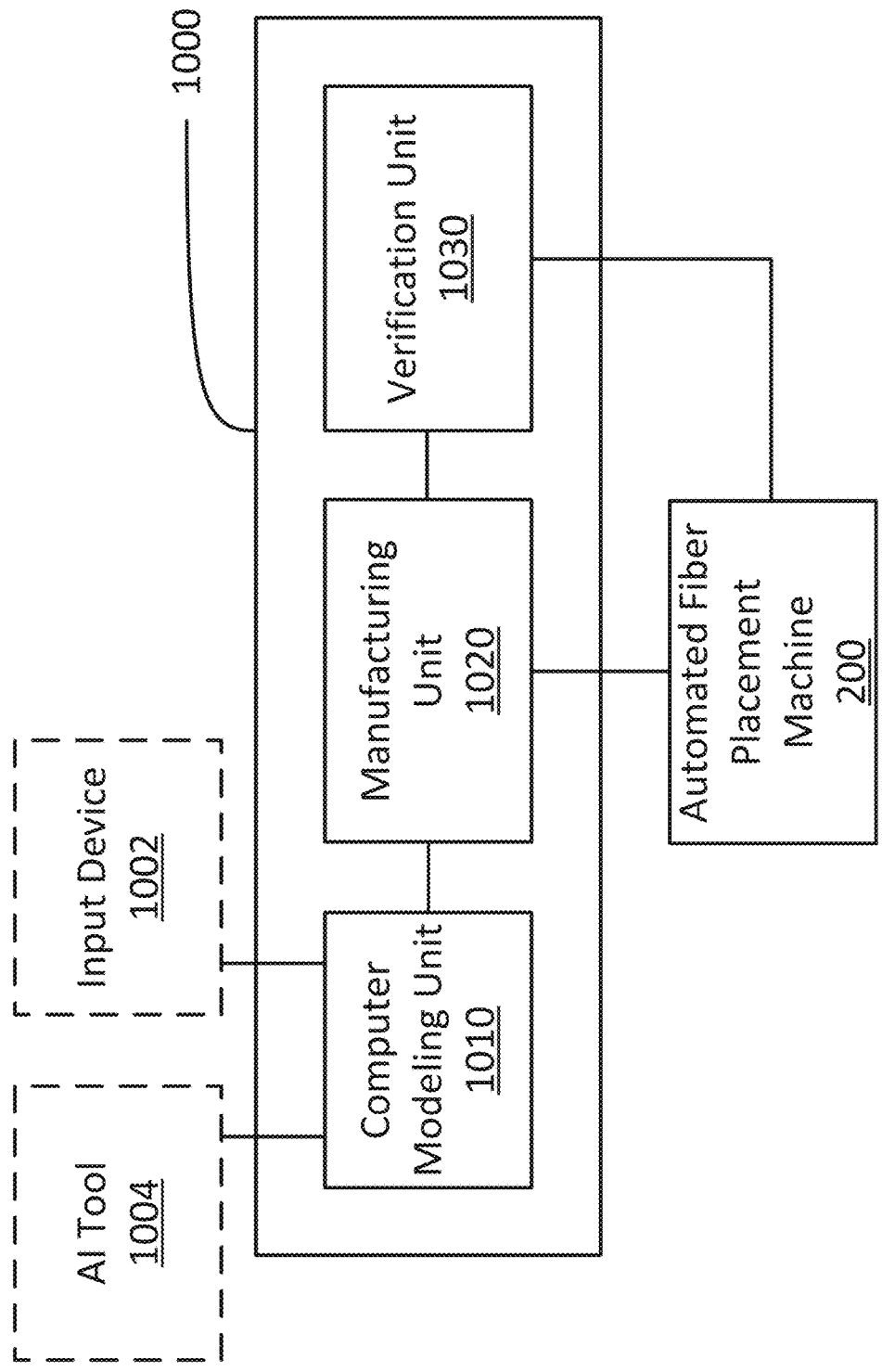
FIG. 10 is a block diagram of an example implementation of a system for automated placement of composite material.

With reference to FIG. 10, there is provided an automated composite material placement (ACMP) system 1000. The ACMP system 1000 is composed of a computer modeling unit 1010, a manufacturing unit 1020, and a verification unit 1030. The ACMP system is also configured for interfacing with one or more input devices 1002 and/or an AI tool 1004, and for controlling operation of the AFP machine 200.

The computer modeling unit 1010 is configured for establishing a set of fiber paths along a surface, which can include the plies 500, 550 for instance on the surface 202, in accordance with step 402. For example, the computer modeling unit 1010 can implement one or more CAD tools and/or one or more graphical display tools for displaying a virtual rendering of the component and the surface 202, for example via a screen. The computer modeling unit 1010 can receive input from a user thereof, for example via the user device 1002, and/or from the AI tool 1004. In some embodiments, the AI tool 1004 can form part of the computer modeling unit 1010.

The computer modeling unit 1010 is also configured for determining the isotropy factor for the component based on the set of fiber paths, in accordance with step 404. In some embodiments, the computer modeling unit 1010 implements a finite element model of the component 201 and/or of the surface 202. The computer modeling unit 1010 is additionally configured for evaluating whether the isotropy factor exceeds a predetermined threshold, in accordance with step 406.

When the isotropy factor exceeds the predetermined threshold, the computer modeling unit 1010 instructs the manufacturing unit 1020 to apply one or more layers of composite material to the surface 202 of the component 201. The manufacturing unit 1020 is configured for instructing the AFP machine 200 to apply the layer(s) of composite material to the surface 202 of the component, as per step 408. Once the layer is applied, the verification unit 1030 validates the layer(s) of composite material by inspecting the composite material as applied to the surface 202, in accordance with step 410. In some embodiments, one or more elements used by the verification unit 1030, for instance a camera or laser-based imaging device, is incorporated as part of the AFP machine 200, and the verification unit 1030 is configured for instructing the AFP machine 200 to, for example, display the reference shape 800 on the surface 202. If the first layer of composite material is found not to be valid, the verification unit 1030 can inform the computer modelling unit 1010.

In some embodiments, where the set of fiber paths is composed of a plurality of plies, the computer modeling unit 1010, the manufacturing unit 1020, and the verification unit 1030 are configured for performing their assigned operations sequentially for each of the plies of the set of fiber paths. For example, the manufacturing unit 1002 is configured for instructing the AFP machine 200 to apply the layers of composite material, each associated with a ply of the set of fiber paths, in an iterative fashion, with the verification unit 1030 validating each of the layers of composite material as applied to the surface 202 after each layer is applied.

When the isotropy factor does not exceed the predetermined threshold, or when the set of fiber paths is found not to be suitable, the computer modeling unit 1010 is configured for identifying at least one region of the surface 202 which is of interest, in accordance with step 420, and for adjusting a position and/or an orientation of some of the fiber paths to produce an adjusted set of fiber paths, in accordance with step 422. The computer modeling unit can then reupdate the isotropy factor and repeat the process until a satisfactory set of fiber paths is established, in accordance with step 424.

It should be noted that in some embodiments, the computer modeling unit 1010 is divided into a first unit which handles the establishing and adjusting of the sets of fiber paths, and a second unit which handles the evaluation of the isotropy factor. Other divisions and/or combinations of various elements are also considered.

At least some of the methods and systems for automated placement of composite material on a surface of a component described herein may be implemented in a high level procedural or object-oriented programming or scripting language, or a combination thereof, to communicate with or assist in the operation of a computer system, for example the computing device 910. Alternatively, some of methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. At least some embodiments of the methods and systems described herein may also be considered to be implemented by way of a non-transitory computer-readable storage medium, for example the memory 1004, having a computer program stored thereon. The computer program may comprise computer-readable instructions, for example instructions 916, which cause a computer, or more specifically the processing unit 912 of the computing device 910, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for automated placement of composite material on a surface for manufacturing a component, the composite material including unidirectional fibers, the method comprising:
    establishing an initial set of fiber paths along the surface, the initial set of fiber paths comprising at least one ply, each ply comprising a respective plurality of fiber paths being substantially aligned with a respective direction;
    determining an isotropy factor for the component based on the initial set of fiber paths, the isotropy factor being a measure of a distribution of the plurality of fiber paths on the surface, the isotropy factor determined, via a finite element analysis, by:
        dividing the component into a plurality of elements;
        evaluating, for each of the plurality of elements, an angular distance between the plurality of fiber paths and a mechanical strength provided by the plurality of fiber paths to obtain one or more local isotropy factors; and
        combining the one or more local isotropy factors into the isotropy factor;
    comparing the isotropy factor to a predetermined threshold;
    determining that the isotropy factor exceeds the predetermined threshold;
    using an automated fiber placement machine for applying, for each of the at least one ply, a respective layer of composite material to the surface of the component, wherein the unidirectional fibers of the composite material are applied along the initial set of fiber paths; and
    validating the initial set of fiber paths by inspecting, for each of the at least one ply, the respective layer of composite material as applied to the surface, the validating comprising:
        projecting a reference shape on the respective layer of composite material as applied to the surface;
        determining an angle between a line portion of the reference shape and an orientation of the unidirectional fibers composing the respective layer of composite material;
        comparing the angle to a predetermined value;
        validating the respective layer of composite material when the angle is lower than the predetermined value; and
        when the angle exceeds the predetermined value, adjusting at least one of a position and an orientation of at least some of plurality of fiber paths, thereby producing a first adjusted set of fiber paths, and repeating, using the first adjusted set of fiber paths as the initial set of fiber paths, the determining, the comparing, the applying, and the validating until the isotropy factor is below the predetermined threshold or the angle is lower than the predetermined value.

2. The method of claim 1, further comprising:
    adjusting the at least one of the position and the orientation of the at least some of the plurality of fiber paths to achieve a given stress profile for at least one region of the surface, thereby producing a second adjusted set of fiber paths, the at least one region identified via the finite element analysis; and
    updating the isotropy factor for the component based on the second adjusted set of fiber paths.

3. The method of claim 1, wherein the at least one ply comprises a first ply substantially aligned with a first direction and a second ply aligned with a second direction different from the first direction.

4. The method of claim 3, wherein the second direction is different from the first direction substantially by one of 90°, 60°, 45°, 30°, −30°, −45° and −60° from the first direction.

5. The method of claim 1, wherein the at least one ply comprises a first ply substantially aligned with a first direction, the first direction corresponding to a 0° orientation for the unidirectional fibers.

6. The method of claim 1, wherein the at least one ply comprises at least two subsequent plies, wherein the respective direction of each of the at least two plies is a common direction.

7. A method for automated placement of composite material on a surface for manufacturing a component, the composite material including unidirectional fibers, the method comprising:
- establishing an initial set of fiber paths along the surface, the initial set of fiber paths comprising at least one ply, each ply comprising a respective plurality of fiber paths being substantially aligned with a respective direction;
- determining an isotropy factor for the component based on the initial set of fiber paths, the isotropy factor being a measure of a distribution of the plurality of fiber paths on the surface, the isotropy factor determined, via a finite element analysis, by:
  - dividing the component into a plurality of elements;
  - evaluating, for each of the plurality of elements, an angular distance between the plurality of fiber paths and a mechanical strength provided by the plurality of fiber paths to obtain one or more local isotropy factors; and
  - combining the one or more local isotropy factors into the isotropy factor;
- comparing the isotropy factor to a predetermined threshold;
- determining that the isotropy factor is below the predetermined threshold;
- identifying at least one region of the surface where the angular distance of at least some of the plurality of fiber paths is greater than a predetermined maximum angular distance or lower than a predetermined minimum angular distance;
- adjusting at least one of a position and an orientation of the at least some of the plurality of fiber paths to maintain the angular distance between adjacent fiber paths of the plurality of fiber paths above the predetermined minimum angular distance or below the predetermined maximum angular distance, thereby producing an adjusted set of fiber paths;
- updating the isotropy factor for the component based on the adjusted set of fiber paths;
- repeating the steps of comparing, identifying, adjusting, and updating until the isotropy factor exceeds the predetermined threshold; and
- using an automated fiber placement machine for applying, for each of the at least one ply, a respective layer of composite material to the surface of the component, wherein the unidirectional fibers of the composite material are applied along the adjusted set of fiber paths.

8. The method of claim 7, wherein identifying the at least one region comprises highlighting the at least one region on a virtual rendering of the component.

9. The method of claim 7, further comprising receiving input indicative of an adjustment to the set of fiber paths, wherein adjusting the position of the at least some fiber paths is based on the input.

10. The method of claim 7, wherein adjusting the position of the at least some of the plurality of fiber paths comprises employing artificial intelligence.

11. The method of claim 7, wherein the at least one ply comprises a first ply substantially aligned with a first direction and a second ply aligned with a second direction different from the first direction.

12. The method of claim 11, wherein the second direction is different from the first direction substantially by one of 90°, 60°, 45°, 30°, −30°, −45° and −60° from the first direction.

13. The method of claim 7, wherein the at least one ply comprises a first ply substantially aligned with a first direction, the first direction corresponding to a 0° orientation for the unidirectional fibers.

14. The method of claim 7, wherein the at least one ply comprises at least two subsequent plies, wherein the respective direction of each of the at least two plies is a common direction.

* * * * *